(12) United States Patent
Budnovitch

(10) Patent No.: US 6,292,110 B1
(45) Date of Patent: Sep. 18, 2001

(54) INTERACTIVE PARKING FACILITY

(76) Inventor: William F. Budnovitch, 8232 Lakeview Ct., Parkville, MO (US) 64152

( * ) Notice: Subject to any disclaimer, the term of this patent is extended or adjusted under 35 U.S.C. 154(b) by 0 days.

(21) Appl. No.: 09/425,461

(22) Filed: Oct. 22, 1999

Related U.S. Application Data

(63) Continuation-in-part of application No. 09/150,417, filed on Sep. 9, 1998, which is a continuation-in-part of application No. 08/866,892, filed on May 30, 1997, now Pat. No. 5,945,925.

(51) Int. Cl.[7] .................................................. B60Q 1/48
(52) U.S. Cl. ........................................ 340/932.2; 340/933
(58) Field of Search .............................. 340/932.2, 933, 340/942, 943, 937

(56) References Cited

U.S. PATENT DOCUMENTS

| | | | |
|---|---|---|---|
| 4,737,758 | * | 4/1988 | Meiksin et al. ................ 340/932.2 |
| 5,432,508 | * | 7/1995 | Jackson ............................ 340/932.2 |
| 5,504,314 | * | 4/1996 | Farmont ................................. 235/384 |
| 5,648,906 | * | 7/1997 | Amirpanahi ..................... 364/464.28 |
| 5,845,268 | * | 12/1998 | Moore ................................... 705/418 |
| 5,877,704 | * | 3/1999 | Yoshida ............................ 340/932.2 |
| 5,910,782 | * | 6/1999 | Schmitt et al. ..................... 340/995 |

* cited by examiner

*Primary Examiner*—Daniel J. Wu
*Assistant Examiner*—Sihong Huang

(57) ABSTRACT

An interactive system for a parking facility includes a plurality of smart light fixtures each having a detection system for detecting empty parking spaces, moving vehicles, and personnel. A control subsystem includes a system processor which interacts with a user interface. The user interface communicates directly with a user and with a smart card whereby parking transactions are automatically recorded and debited to an account. A key fob transmitter transmits signals to a smart fixture for summoning emergency assistance. The system processor utilizes GPS coordinates for guiding users, locating parking spaces, and identifying smart light fixtures receiving emergency assistance signals.

1 Claim, 14 Drawing Sheets

INTERACTIVE PARKING FACILITY

CROSS REFERENCE TO RELATED APPLICATIONS

This application is a continuation-in-part of U.S. patent application Ser. No. 09/150,417, filed Sep. 9, 1998; which is a continuation-in-part of U.S. patent application Ser. No. 08/866,892 filed May 30, 1997, now U.S. Pat. No. 5,945,925, issued Aug. 31, 1999.

1. FIELD OF THE INVENTION

The present invention relates generally to parking facilities, and in particular to an interactive parking facility utilizing a lighting system, GPS, a smart card, and a key fob for user interface.

2. DESCRIPTION OF THE PRIOR ART

Parking facilities, particularly in urban areas, often have large numbers of parking spaces distributed among multiple floors. Using such massive facilities tends to be inefficient, because motorists must initially find available parking spaces, and later must return to their vehicles. Many of the customers of such parking facilities are unfamiliar with them and hence can become disoriented.

Lighting fixtures are commonly installed in parking structures for safety and security purposes. Since parking garages are often used during the hours of darkness, artificial illumination is desirable to reduce collision risks, enhance safety, etc. Moreover, parking garages are sometimes regarded as risky from the standpoint of personal attack. Such risks can be enhanced by the vulnerability of motorists as they enter and leave their vehicles and are thus preoccupied with retrieving vehicle keys, locking and unlocking vehicle doors, loading or unloading items in the vehicle, etc. Such activities tend to preoccupy motorists, and assailants have been known to time their attacks for such moments of vulnerability.

Another security problem with parking structures is that vehicles parked therein afford numerous hiding places for would-be assailants. Other hazards associated with parking structures include collision risks associated with vehicles entering and leaving parking spaces. For example, when a vehicle backs out of a parking space, its driver's rearward vision is often limited, thus increasing the chances of a collision with a vehicle in the drive aisle. Another common problem encountered by motorists in parking structures relates to locating available spaces. Considerable amounts of unnecessary driving often occur as motorists traverse the drive aisles in large parking structures seeking empty parking spaces.

A partial solution to safety and security issues associated with parking structures is to provide illumination by mounting light fixtures therein. However, the normal design standards for parking structure illumination require only relatively low illumination levels, e.g., about 0.5 foot candles per square foot.

Light fixtures have previously been used for security purposes by coupling them with motion detection switching systems. For example, U.S. Pat. Nos. 5,381,323; 5,434,764 and 5,442,532 disclose lighting fixtures with motion or proximity detectors. Such lighting fixtures can be used in areas in which illumination is desired when personnel are present. They tend to discourage intruders and would-be assailants by depriving them of the cover of darkness.

Motion sensing electronics are well known in the art. For example, the Ravas U.S. Pat. No. 3,459,961 discloses a movement responsive light control means. The Ravas '961 patent motion sensor utilizes a doppler shift in a transmitted signal frequency to detect movement and thus trigger a firing circuit, which in turn switches a load (e.g., a light) to an on condition. Other sensor systems currently available utilize sonar and infrared technology to detect objects and object movement.

Heretofore there has not been available a detection system for a light fixture with the safety and security advantages of the present invention. The present invention addresses some or all of the foregoing safety and security issues as they relate to parking structures and lighting systems therefore.

SUMMARY OF THE INVENTION

In the practice of the present invention, a detection system is provided for a light fixture in an interactive parking structure including a parking space, a drive aisle and a ceiling. The detection system includes a sensor subsystem with vehicle and personnel sensors, an indicator/display subsystem with empty space, moving vehicle and personnel indicators; and a control subsystem. The control subsystem includes memory, switching and logic units for receiving and storing data corresponding to predetermined situations and switching the indicators in response to signal inputs from the sensors. The control subsystem can store GPS coordinates of particular parking facility features and can interface with a vehicle equipped with a GPS navigation system to assist the driver in locating a parking space. A smart card is provided for recording use of a parking facility by a user and can be utilized for controlling access to different areas within a parking facility. In another embodiment of the invention, a key fob transmits messages to the system for summoning assistance. The system can determine the location of a user by identifying a particular light fixture receiving a transmission from the user's key fob.

OBJECTS AND ADVANTAGES OF THE INVENTION

The principle objects and advantages of the present invention include: providing a "smart" light fixture; providing a detection system for a light fixture; providing such a detection system which includes a vehicle detector; providing such a detection system which includes a personnel detector; providing such a detection system which is adapted for mounting in different types of light fixtures; providing such a protection system which is adapted for mounting in light fixtures installed in parking structures; providing such a detection system which is adapted for use in light fixtures installed in high bay industrial applications; providing such a light fixture which includes a programmable logic controller; providing such a detection system which can enhance safety and security in facilities where it is installed; providing an interactive parking facility which utilizes the Global Positioning System (GPS) interactively with a user; providing an interactive parking facility which utilizes a smart card for interfacing with a user; providing an interactive parking facility which utilizes a key fob for interacting with a user; and providing such a parking facility which is economical to manufacture, efficient in operation, capable of a long operating life and particularly well adapted for the proposed uses thereof.

Other objects and advantages of this invention will become apparent from the following description taken in conjunction with the accompanying drawings wherein are set forth, by way of illustration and example, certain embodiments of this invention.

DETAILED DESCRIPTION OF THE PREFERRED EMBODIMENTS

I. Introduction and Environment

Figure 1:
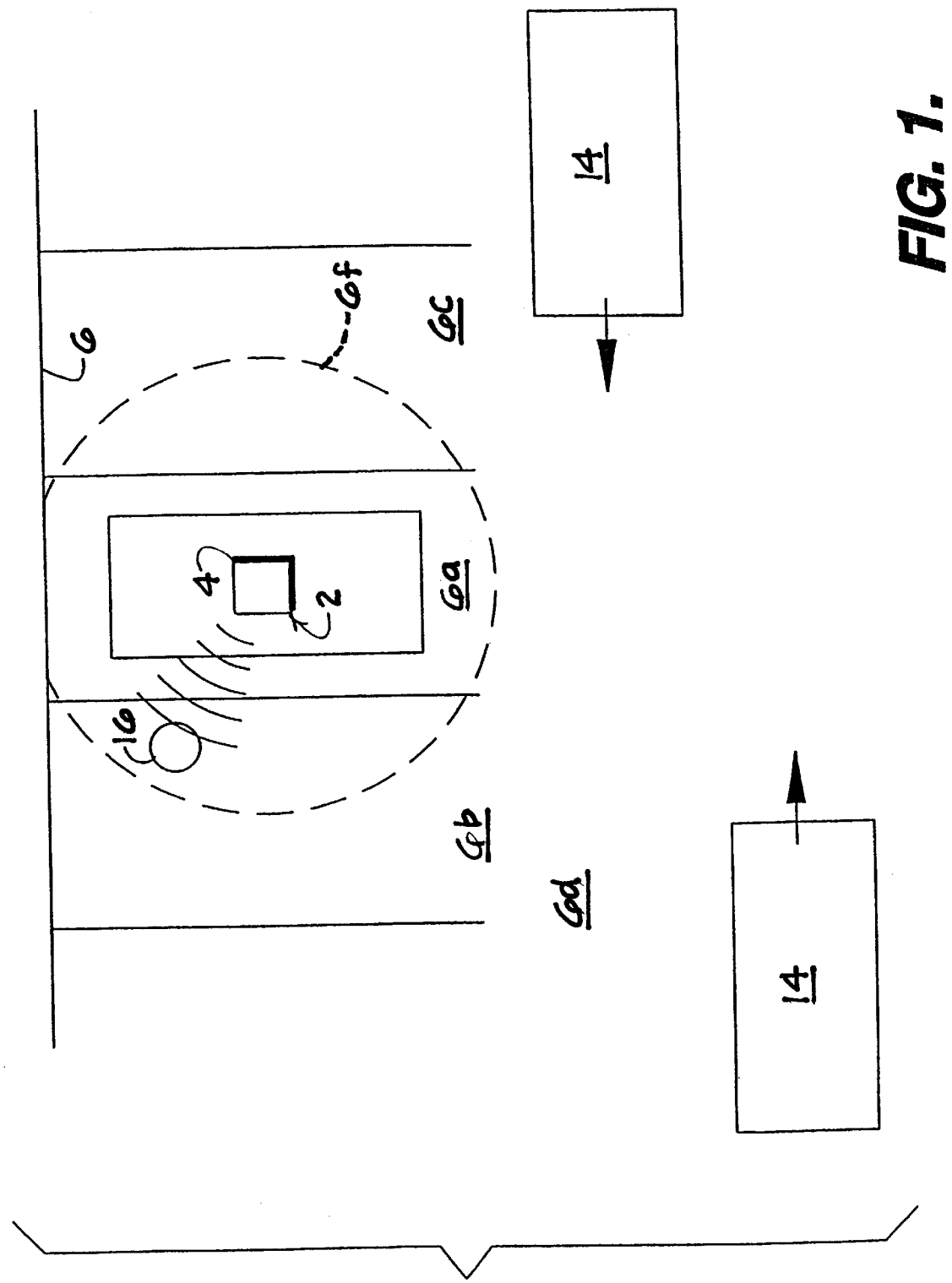
FIG. 1 is a plan view of a parking facility application of the present invention.
Figure 2:
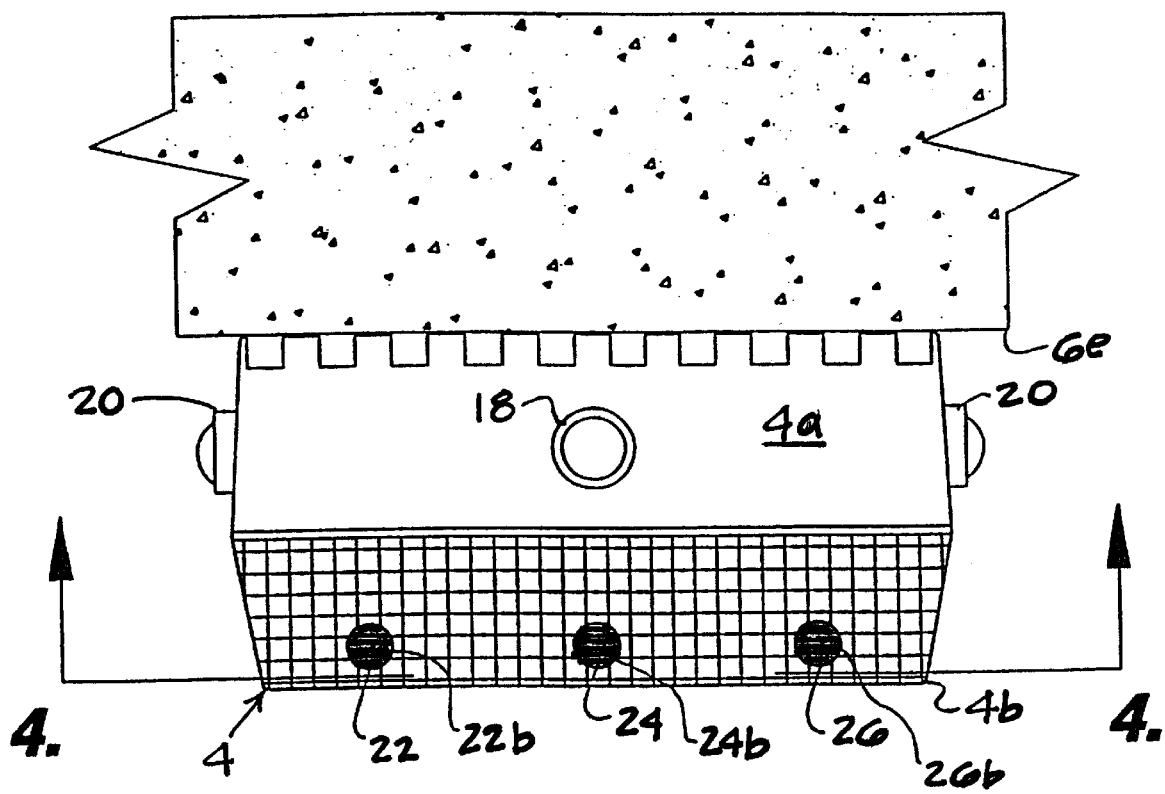
FIG. 2 is a side elevational view of the light fixture thereof, shown mounted on a ceiling of the parking facility.
Figure 3:
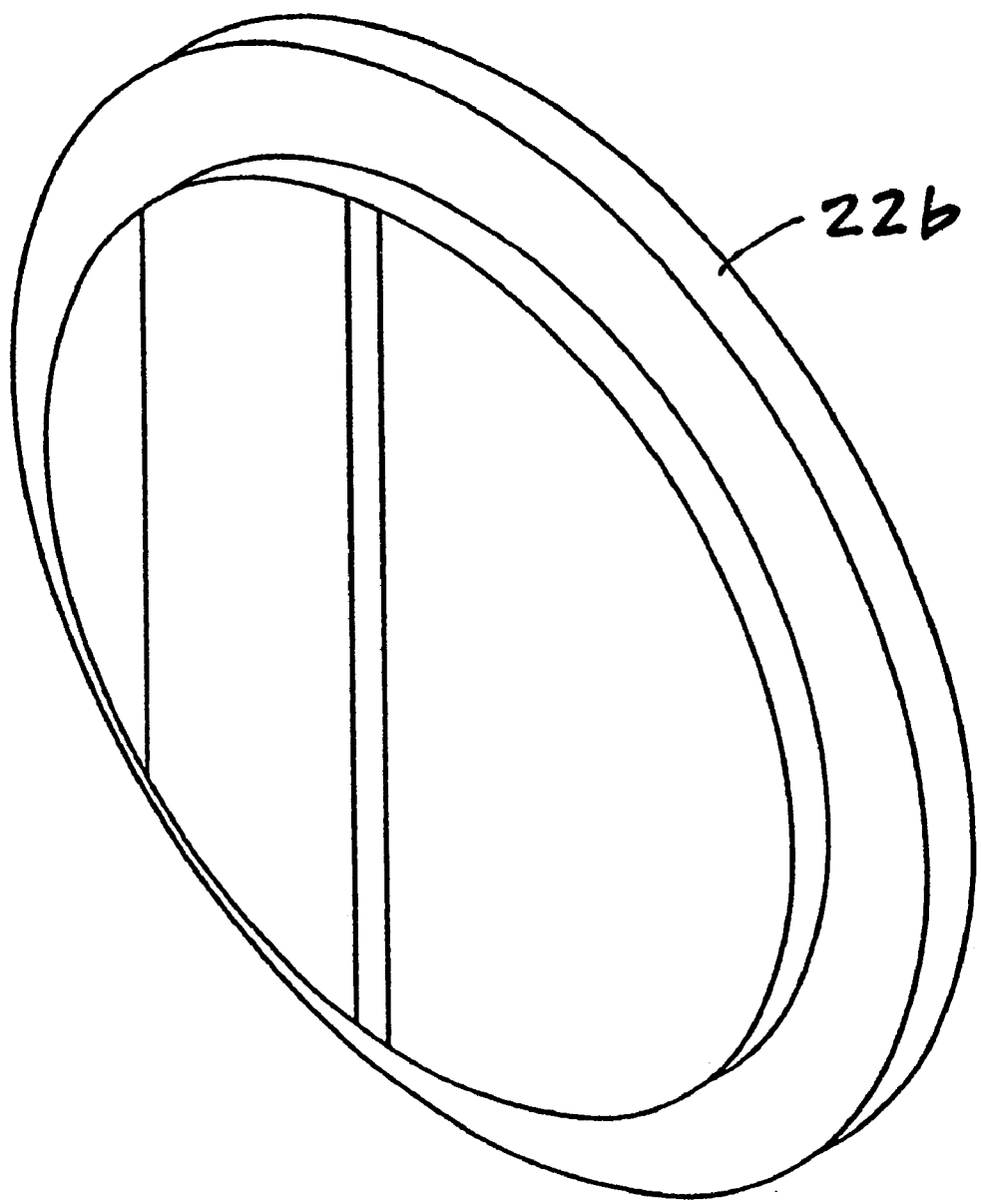
FIG. 3 is a perspective view of a fresno lens for mounting over a LED thereof.
Figure 4:
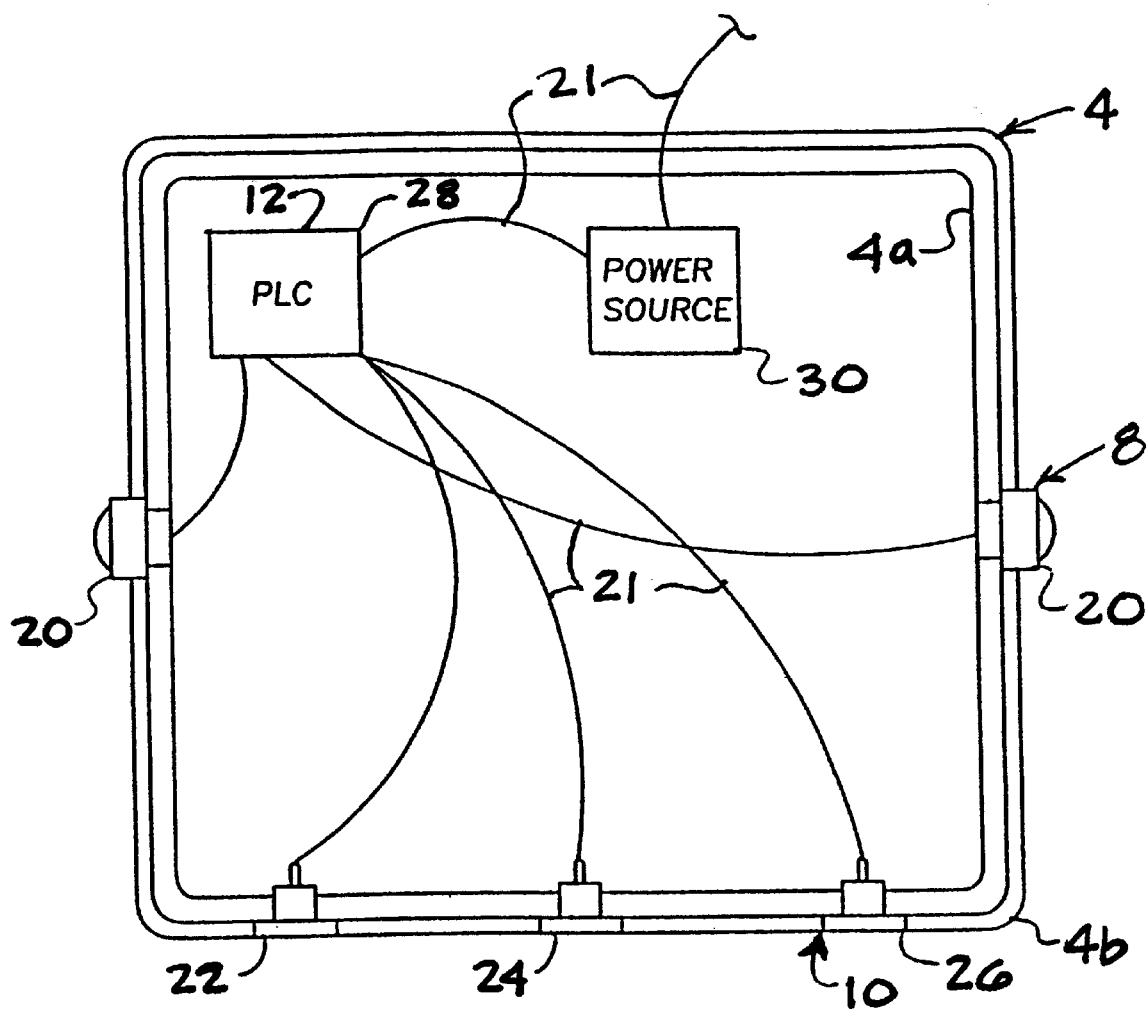
FIG. 4 is a bottom plan view of the light fixture taken generally along line 4—4 in FIG. 2 and generally shows the installation of the detection system in the light fixture.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said tenninology will include the words specifically mentioned, derivatives thereof and words of a similar import.

Referring to the drawings in more detail, the reference numeral 2 generally designates a detection system incorporated in a light fixture 4 having a base 4a and a lens 4b. Without limitation on the generality of useful applications of the detection system 2, it is shown mounted in a parking structure 6 including a plurality of parking spaces 6a,b,c; a drive aisle 6d at the ends of the parking spaces 6a,b,c; and a ceiling 6e located thereover.

The detection system 2 generally comprises a sensor subsystem 8, an indicator/display subsystem 10 and a control subsystem 12. The detection system 2 is designed to detect both vehicles 14 and personel 16.

II. Sensor Subsystem 8

The sensor subsystem 8 includes a vehicle sensor 18 mounted on the fixture base 4a and directed at a respective parking space 6a. The vehicle sensor 18 is adapted to provide a stationary vehicle presence signal to indicate occupancy of the parking space 6a, and a moving vehicle signal to indicate movement of a vehicle 14 with respect to the parking space 6a. A personnel sensor 20 is directed to the vicinity 6f of the parking space 6a and is adapted for emitting a "person present" signal if a person 16 is detected within such vicinity 6f.

Figure 5:
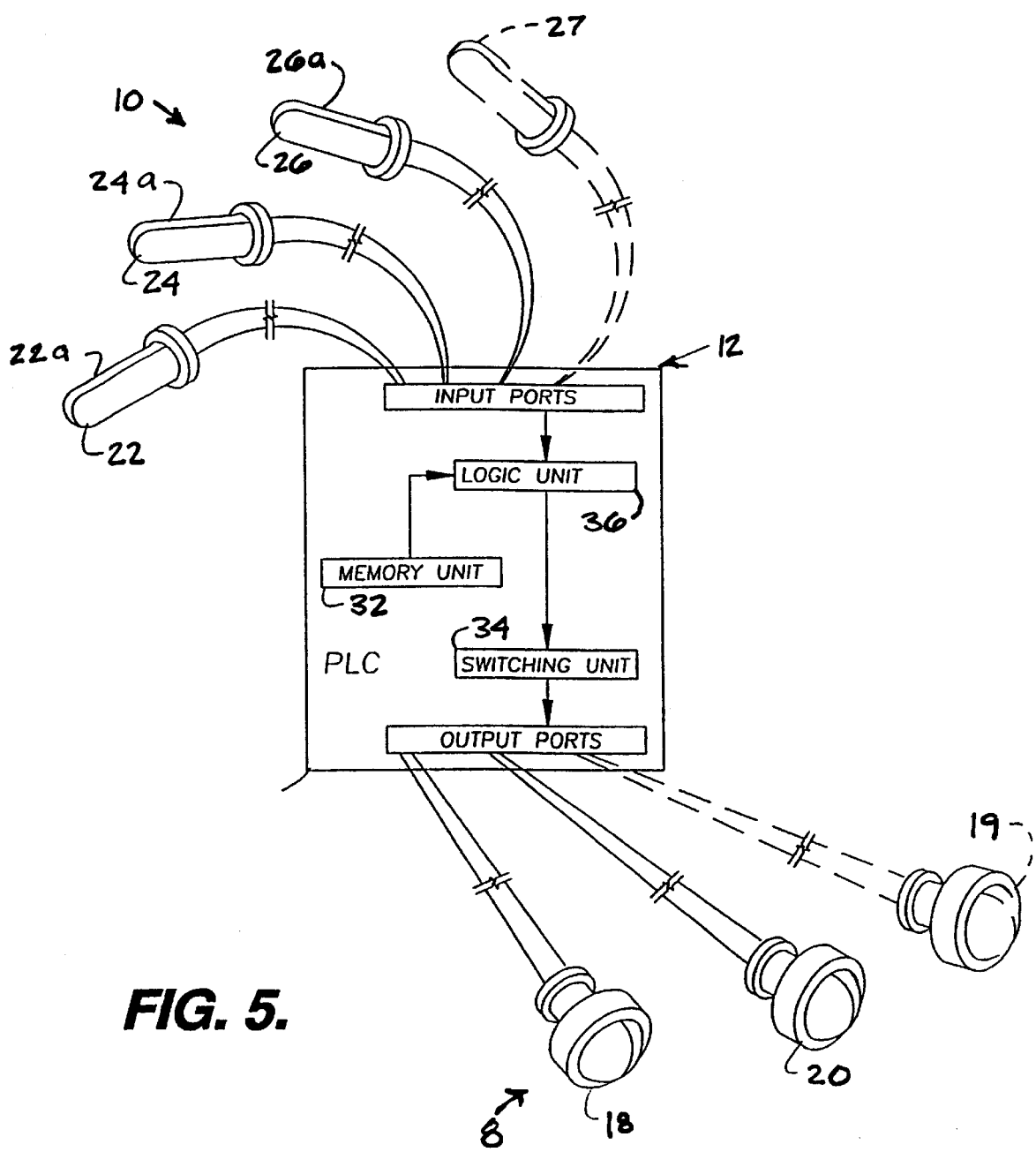
FIG. 5 is a schematic diagram of the detection system, showing a sensor subsystem, an indicator/display subsystem and a control subsystem thereof.

The vehicle and personnel sensors 18, 20 can comprise any suitable sensor. For example, infrared sensors are available for detecting movement of heat-emitting objects, such as personnel and moving vehicles. Infrared sensors could be incorporated in both the vehicle sensor 18 and the personnel sensor 20. For detection of a stationary vehicle, the vehicle sensor 18 could employ sonar to transmit and receive signals for detecting the presence of a vehicle 14 in the parking space 6a. An optional, additional sensor is shown at 19 (FIG. 5).

III. Indicator/Display Subsystem 10

The indicator/display subsystem 10 includes a space available indicator 22, a person present indicator 24 and a moving vehicle indicator 26. The indicators 22, 24, 26 can be suitably color-coded, i.e., green, yellow and red respectively. The indicators 22, 24 and 26 can include, for example, light emitting diodes (LEDs) 22a, 24a, 26a respectively. Each indicator 22, 24, 26 can also include a fresno lenses 22b (green), 24b (yellow), 26b (red) respectively, which lenses are mounted on the light fixture lens 4b immediately outside respective LEDs 22a, 24a, 26a. The fresno lenses 22b, 24b, 26b function to enlarge the illumination patterns created by the LEDs 22a, 24a, 26a for greater visibility to an approaching motorist. An optional, additional LED is shown at 27 (FIG. 5).

IV. Control Subsystem 12

The control subsystem 12 includes a programmable logic controller (PLC) 28 connected to a power source 30, which can comprise an alternating current source shared with the light fixture 4, a battery, or a combination AC and a rechargeable battery. Battery-powered capabilities for the detection system 2 have the advantage of providing emergency operation in the event of a power interruption. Thus, even if the light fixture 4 were not functioning, the detection system 2 could provide safety information to detect the presence of an intruder, a moving vehicle, etc.

The PLC 28 includes a memory unit 32, a switching unit 34 and a logic unit 36, all suitably interconnected with each other and with the sensor and indicator/display subsystems 8, 10 by suitable wiring 21. The memory unit 32 is preferably programmable to receive data corresponding to predetermined conditions, such as the types of infrared signatures to which the control system will respond, and the sonar signature of a vehicle located within the parking space 6a. A suitable source of photoelectric sensors is Banner Engineering Corporation, P.O. Box 9414, Minneapolis, Minn. 55440.

The logic unit 36 processes signals from the sensor subsystem 8 and actuates the switching unit 34 to illuminate or deilluminate the appropriate indicators 22, 24, 26. It will be appreciated that the PLC can be programmed to respond to a variety of different conditions as appropriate.

V. First Modified Embodiment Detection System 102

Figure 6:
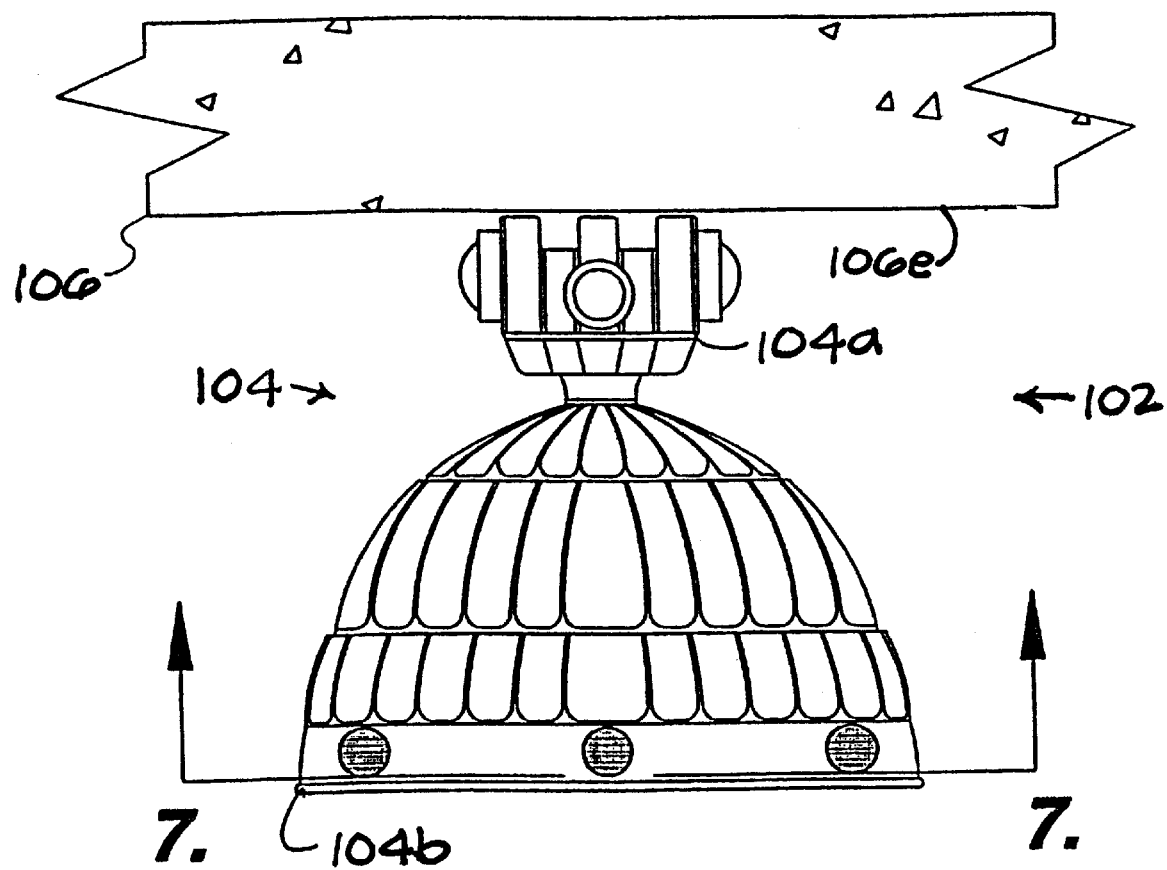
FIG. 6 is a side elevational view of a high bay industrial fixture application of a light fixture with a detection system embodying the present invention and comprising a first modified embodiment thereof.
Figure 7:
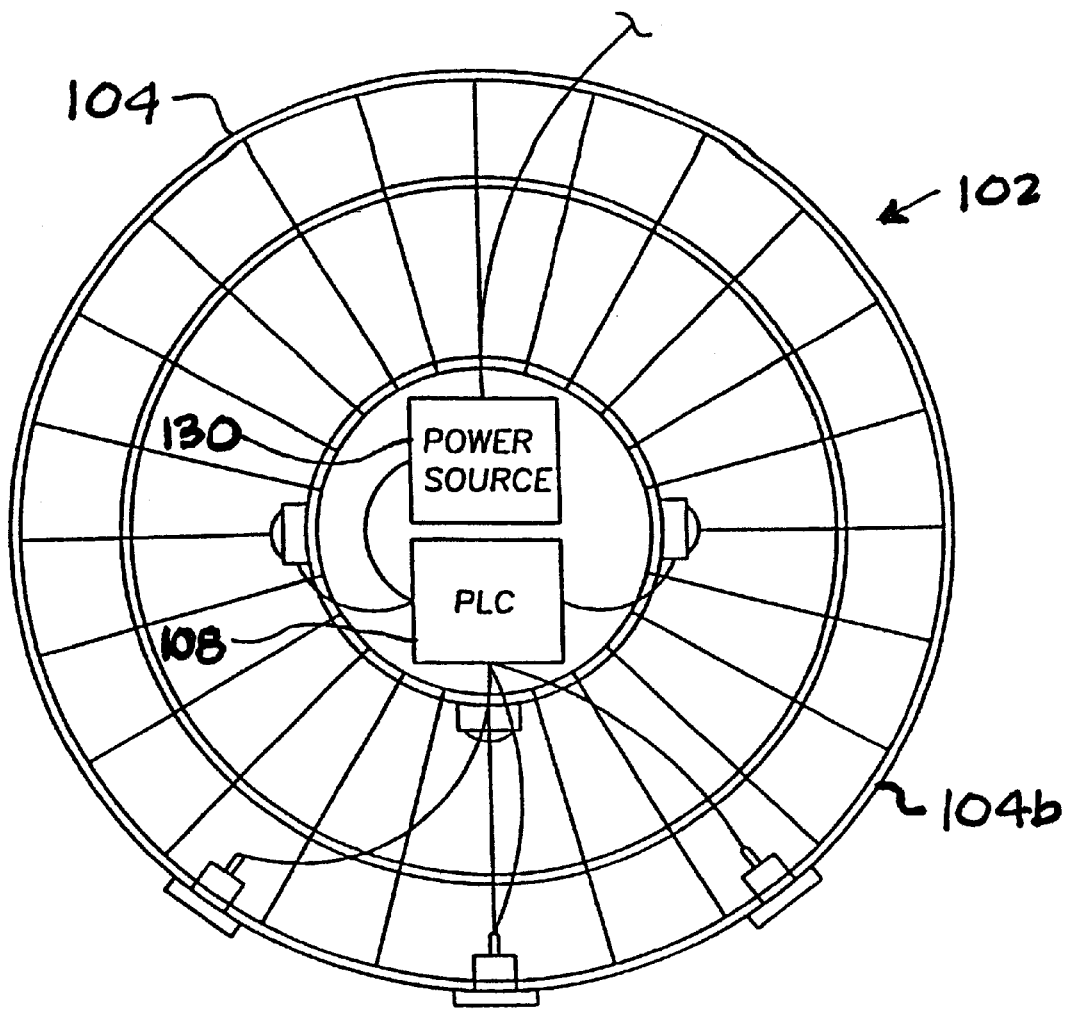
FIG. 7 is a bottom plan view thereof taken generally along line 7—7 in FIG. 6 and generally shows the installation of the detection system in the light fixture.

A detection system 102 comprising a first modified embodiment of the present invention is shown in FIGS. 6–7 and is installed in a high bay industrial type fixture 104 4 including a fixture base 104a mounted on the parking structure ceiling 6e and a fixture reflector 104b mounted on and depending downwardly from the fixture base 104a.

The ceiling 106e on which the fixture 104 is mounted can be located at a substantial height, e.g., 15 feet to 25 feet high. Light fixtures such as that shown at 104 are commonly used for such relatively high installations. The detection system 102 is otherwise adapted for operating in a manner similar to the detection system 2, and includes a PLC 108 and a power source 130, similar subsystems to those described above.

VI. Second Modified Embodiment Detection System 202

Figure 8:
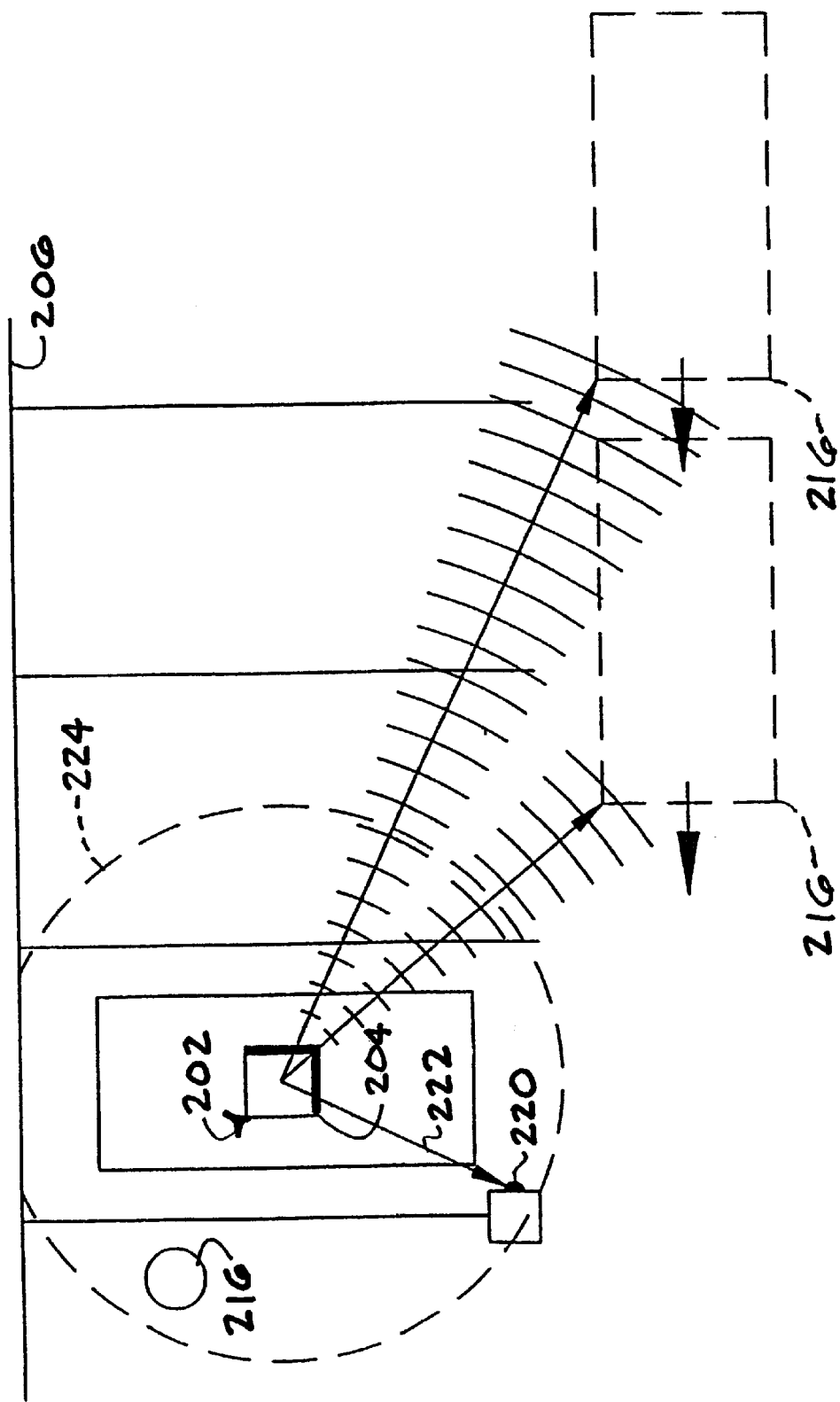
FIG. 8 is a plan view of a parking facility application of the present invention, comprising a second modified embodiment thereof.
Figure 9:
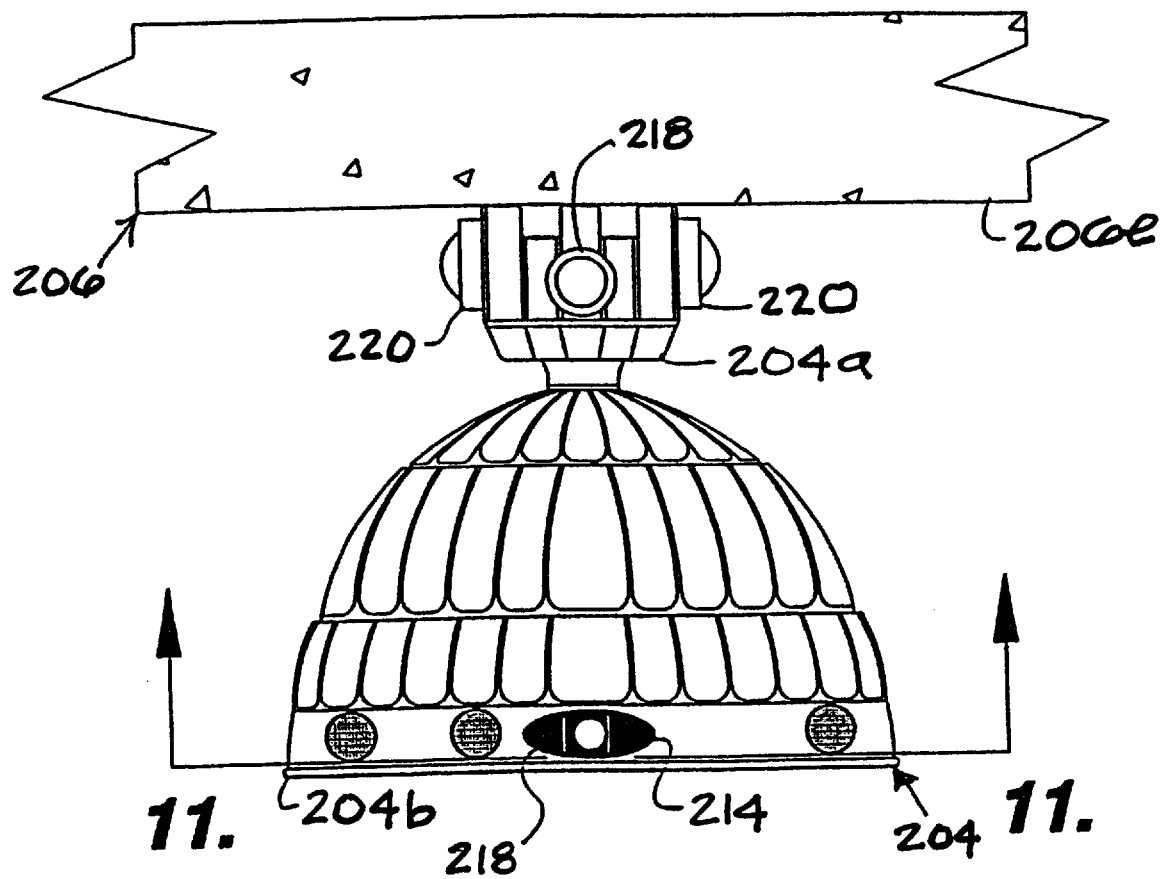
FIG. 9 is a side elevational view thereof.
Figure 10:
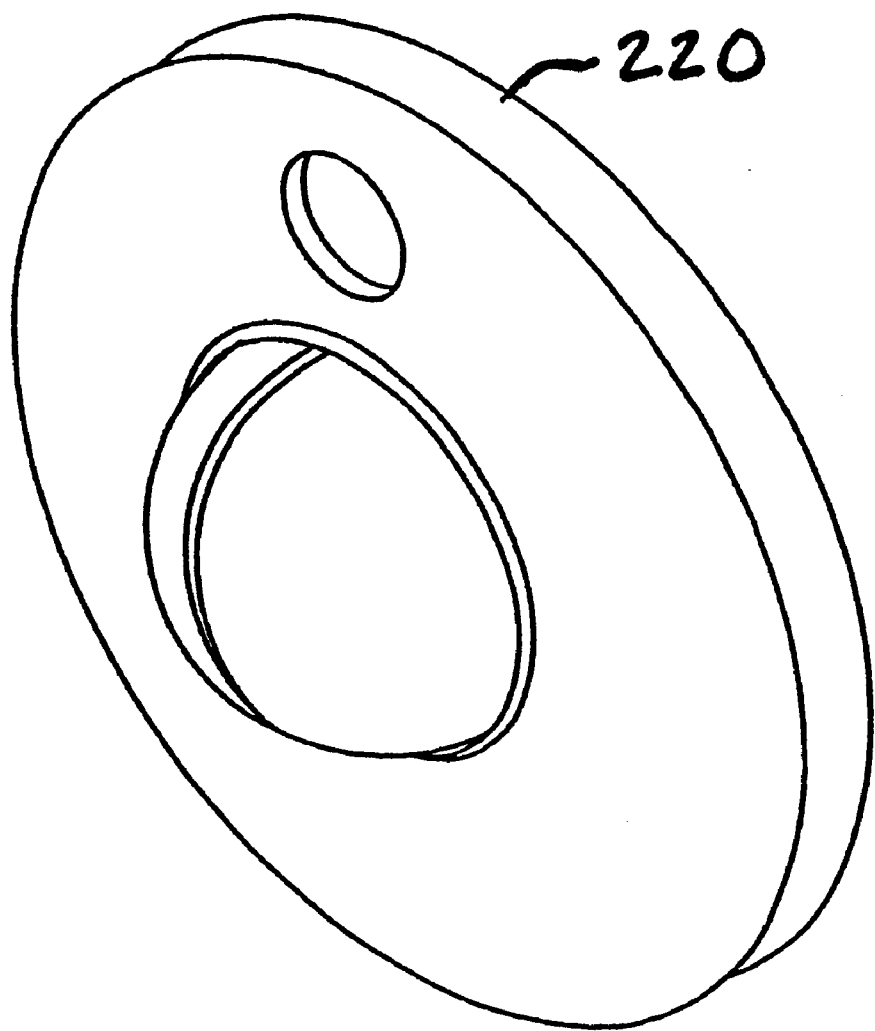
FIG. 10 is a perspective view of a laser reflector of the second modified embodiment detection system.
Figure 11:
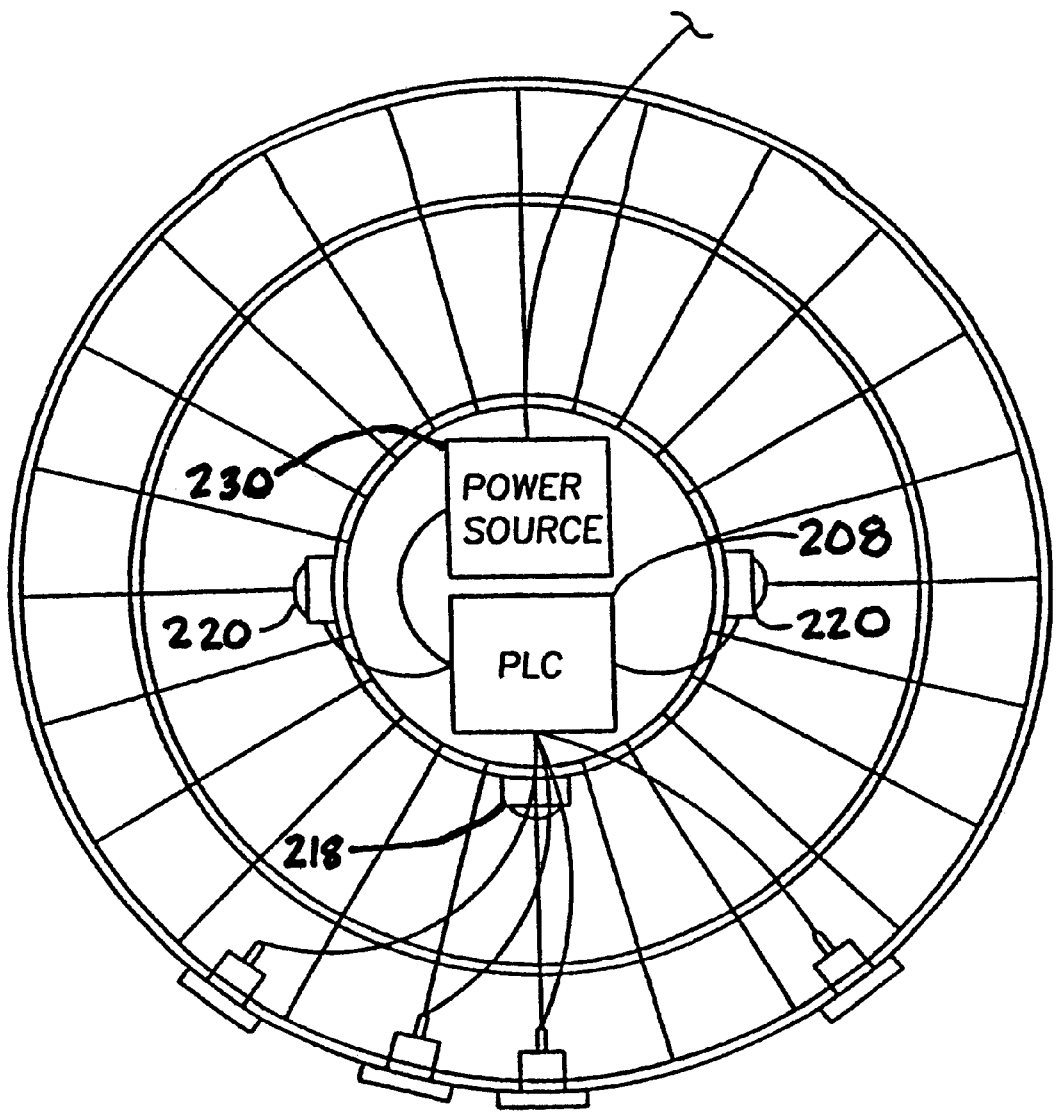
FIG. 11 is a bottom plan view of the light fixture taken generally along line 11—11 in FIG. 9 and generally shows the installation of the detection system in the light fixture.

A detection system 202 comprising a second modified embodiment of the present invention is shown in FIGS. 8–10 and is incorporated in a high bay industrial fixture 204 like the fixture 104 described above with a base 204a and a reflector 204b. The fixture 204 is adapted for mounting on a parking or industrial structure ceiling 206e, which can be located a substantial distance, e.g., 15 to 25 feet, above a floor surface. The detection system 202 includes a PLC 208, such as the PLC 8 described above with sensor, indicator/display and control subsystems, and a power source 230.

The detection system 202 includes vehicle and personnel sensors 218, 220 as described above, and also includes an approaching vehicle sensor 214. A signal from the approaching vehicle sensor 214 is processed by the detection system 202 to determine a range and speed of an approaching vehicle 216.

The PLC 208 includes a laser light source means 218 for emitting a directional laser beam 222. The detection system 202 further includes a laser reflector 220 mounted at approximately nominal visual height (e.g., about 4 to 8 feet) within the path of the laser light beam 222. The detection system 202, in addition to the functions described above, responds to the proximity of the approaching vehicle 216 when a potential hazard situation exists. For example, the detection system 202 can cause the laser light source 218 to emit a pulsating signal, visible on the laser reflector 220 to an approaching driver, when the approaching vehicle is within 25 feet. The pulsating signal can signify either a vehicle backing out of the parking space 6a, a person 216 in the vicinity 224 thereof, or both. When the approaching vehicle 216 comes within a second predetermined range, e.g., 12 to 18 feet, the detection system 202 can cause the laser light beam 222 to be emitted continuously from the laser light source 218, thus indicating that the approaching vehicle 216 should stop. When the potential hazard leaves the vicinity of the parking space 6a, the laser light source 218 would deactivate, thus signaling the approaching driver to proceed.

VII. Third Modified Embodiment Detection System 302.

Figure 12:
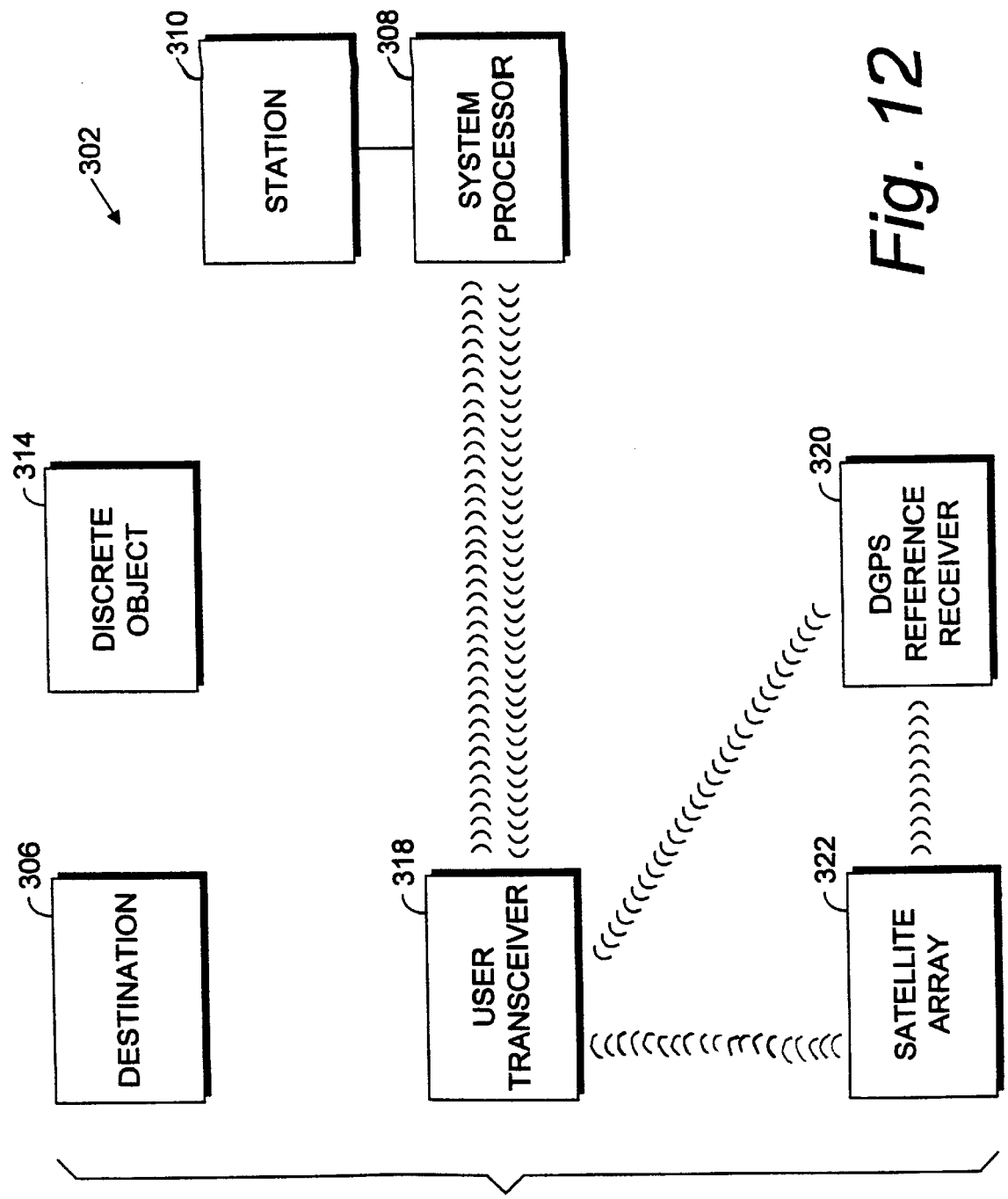
FIG. 12 is a schematic diagram of a detection system comprising a third modified embodiment of the present invention and incorporating interactive global positioning system (GPS) components.

A detection system 302 comprising a third modified embodiment of the present invention is show in FIG. 12 and utilizes the global positioning system ("GPS") for user assistance in locating destinations, such as a parking space 306, and discrete objects 314, such as a vehicle or a person. The detection system 302 includes a system processor 308 which can be connected by any suitable means, e.g. hard-wired network or wireless, to multiple stations 310. The stations 310 can be associated with particular areas within a parking structure, and can incorporate the sensor, indicator/display and control subsystems of the detection systems 2, 102 and 202 described above.

The system processor 308 is adapted for two-way communication, through either hard-wired or wireless interfaces with a user transceiver 318 which includes differential global positioning system (DGPS) capabilities.

A preferred form of global positioning system technology involves a differential global positioning system (DGPS) which utilizes a fixed reference receiver 320, for example located in proximity to the system processor 308. The fixed reference receiver 320 receives positioning signals from one or more satellites in a satellite array 322. The satellite array 322 consists of a constellation of satellites in orbit over the earth. The satellites' positions are continually monitored for GPS reference purposes. The user transceiver 318 can accompany a visitor to or user of the facility equipped with the detection system 302, and can comprise, for example, a hand-held unit or a unit mounted in a vehicle. The user transceiver 318 can comprise a GPS navigational system of the type currently being installed in many vehicles.

In operation, the system processor 308 can store GPS coordinate information relating to predetermined locations, such as parking spaces. The system processor 308 also receives information, for example, from the stations 310, which can include GPS coordinate information for moving and transient objects, such as vehicles and personnel. The user transceiver 318 interacts with the system processor 308 to provide a user/visitor with such information as the location of available parking spaces in reference to the position of the user/visitor, as well as information concerning moving and transient objects. The user/visitor can thus effectively be guided to a destination, for example, an available parking space, by the interactive cooperation of the user transceiver 318, the system processor 308 and the stations 310. The ability of a user/visitor to receive relatively precise directions to such destinations as available parking spaces, exits from parking facilities, emergency assistance, etc. has the potential for making facilities more convenient and safe to large numbers of users/visitors.

Emergency assistance features can also be incorporated into the detection system 302. For example, the system 302 can accomodate interaction between the system processor 308 and emergency services, such as medical emergency, police and fire departments. Thus, the location of an emergency situation or the origin of an emergency assistance request from a user transceiver 318 can be instantly relayed to appropriate emergency assistance personlel. By cquipping emergency personnel with compatible GPS navigational equipment, response times can be shortened and emergency assistance services can be significantly improved.

Differential GPS Explained and GPS—A Guide to the Next Utility, by Trimbel Navigational Limited, Sunnyvale, Calif. 94088-3642 (1993) are incorporated herein by reference.

VIII. Fourth Modified Embodiment Interactive System 402

Figure 13:
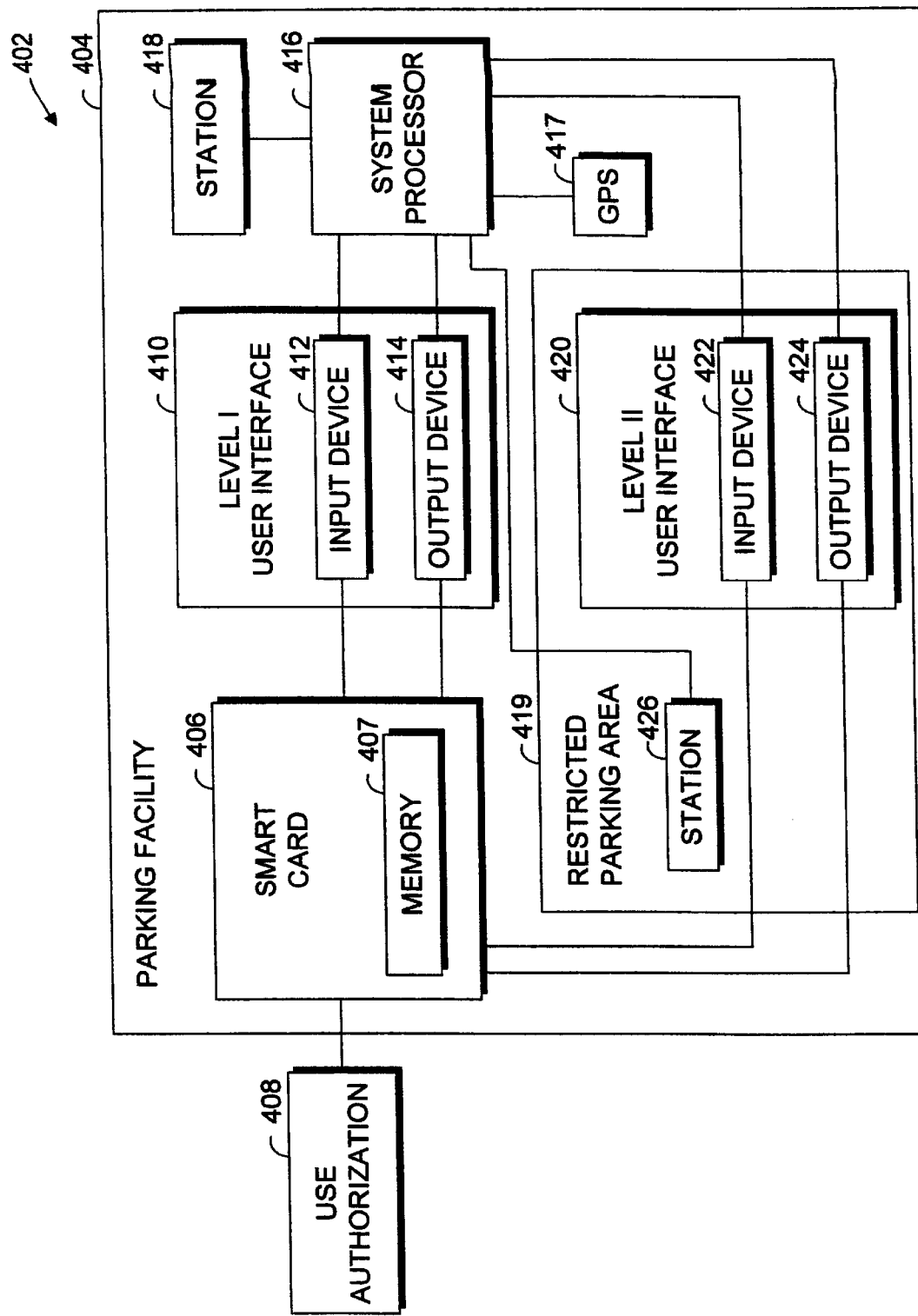
FIG. 13 is a schematic diagram of an interactive parking facility comprising a fourth modified embodiment of the present invention and including a smart card feature.
Figure 14:
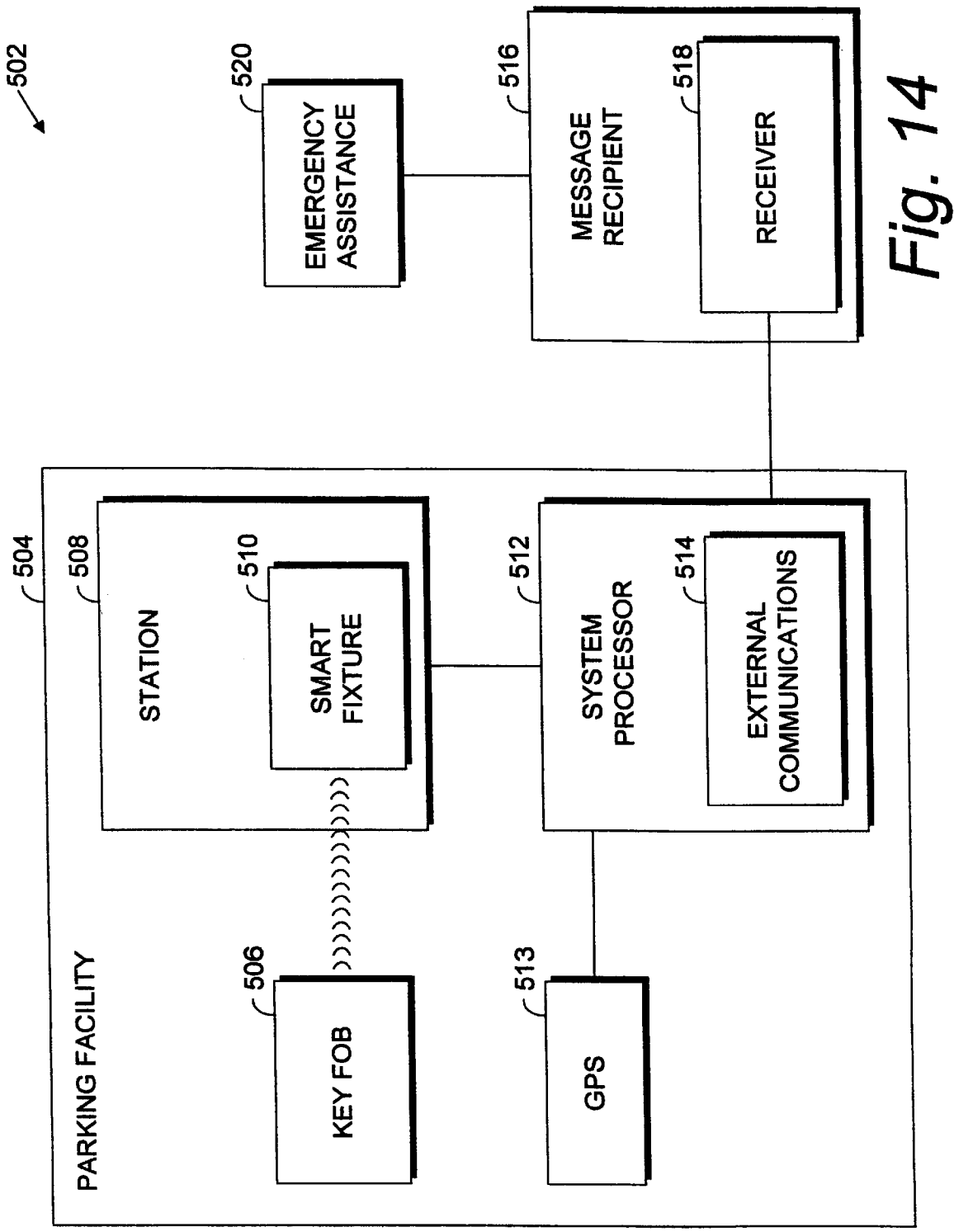
FIG. 14 is a schematic diagram of an interactive parking facility comprising a fifth modified embodiment of the present invention and including a key fob transmitter for user communication with the control system.

An interactive system 402 for a parking facility 404 comprising a fourth modified embodiment of the present invention is shown in FIG. 13 and includes a "smart", i.e. interactive, card 406 adapted for encoding with such information as user identification, level of parking privilege authorization, etc. A use authorization 408 interacts with the smart card 406 to establish a predetermined credit limit and to record parking transactions to the respective users' accounts. The smart card 406 can function as a prepaid credit card by which the user prepurchases parking services and is entitled to use same until the credit is depleted or until additional credits are prepurchased. Alternatively, the smart card 406 can function as a debit card which automatically deducts funds from an account as it is being used, much like an ATM card. The smart card 406 and the use authorization 408 can interact in a variety of different arrangements for facilitating the efficient and convenient use of the parking facility 404 and for paying for such usage. By way of further example, smart cards 406 can be produced with predetermined face values representing their purchase prices. When the cards' face values have been depleted, they can be disposed of and additional cards purchased.

The system 402 includes a Level I user interface 410 which interfaces the smart card 406 with a system processor 416. The user interface 410 includes an input device 412, such as a magnetic strip reader, a card reader, a keyboard, a keypad, a bar code scanner, a touch screen, or any other suitable input device 412 capable of receiving data from the user directly or by means of the smart card 406. The user interface 410 also includes an output device for communicating with the user. The output device 414 can comprise a display device such as a CRT monitor, an LCD, an LED, an audio speechbased annunciator, a printer, etc.

The system processor 416 processes the data received from the smart card 406 by way of the input device 412, processes same, and communicates to the user by way of the output device 414. The system processor 416 also communicates with one or more stations 418 which can be equipped with smart fixtures such as those described above. For example, the light fixtures within the parking facility 404 can activate to indicate locations of available parking spaces. Still further, the availability and the location of such parking spaces can be communicated to the users through the user interface output device 414. The system processor 416 can be programmed to interface with the smart card 406 and debit same for parking facility usage. Since the smart card 406 has memory 407, the system processor 416 can make the appropriate data entries in the smart card 406 by means of the interface 410. A GPS subsystem 417, the configuration and function of which are described above, is coupled to the system processor 416.

The system 402 further includes a Level II user interface 420 including an input device 422 and an output device 424, which can be similar to the input/output (I/O) devices 412, 414 described above. The Level II user interface 420 can be used for controlling access to a restricted area 419 of the parking facility 404 such as a VIP or preferred customer area. Moreover, the restricted access level can be employed for security purposes by providing a higher level of security thereat than in the general parking area. For example, tenants in a commercial building can be provided with Level II privileges, whereas visitors and others can be limited to Level I parking facility access. The Level II user interface 420 interacts with the smart card 406 in the same manner as the Level I user interface 410. The Level II user interface 420, by means of the system processor 416, can provide access to additional, preferred parking with a station 426, which can include a smart fixture such as those described above.

It will be appreciated that additional levels of accessability can be provided within the parking facility 404 and accommodated by suitable additional user interfaces.

IX. Fifth Modified Embodiment Interactive System 502

The reference numeral 502 generally designates an interactive system for a parking facility 504 comprising a fifth modified embodiment of the present invention and including a key fob transmitter 506. The key fob transmitter transmits signals received by a smart fixture 510 associated with a station 508 within a parking facility 504. The key fob transmitter 506 can employ any type of transmission means, including various wireless, hardwired, fiber optic, etc. means for transmitting signals and data. For example, a relatively low-powered unit transmitting in the infrared or rf range can be employed. The key fob 506 transmission system can be designed in relation to the physical spacing of the smart fixtures 510 whereby a transmitted signal would always be received by at least one smart fixture 510. The smart fixture 510 is linked to the system processor 512, which can determine the approximate location of a transmitting key fob 506 utilizing a GPS component 513, such as that described above, connected to the system processor 512. For example, the GPS coordinates of a respective smart fixture 510 receiving a signal transmitted by a key fob 506 could be identified by the system processor and employed to direct emergency personnel to the approximate location of the transmitting key fob 506. The system processor 512 includes external communications 514 for transmitting data and signals externally to the parking facility 504. A message recipient 516 includes a receiver 518 for receiving signals and data transmitted by the external communications 514 of the system processor 512. The message recipient 516 can comprise, for example, a security service, a monitored control consol for the parking facility 504, law enforcement officials, or a telecommunications network adapted for relaying the transmitted signals to emergency assistance 520. The key fob 506 can be equipped with a suitable input device, such as a key pad or an array of switches, for transmitting different types of signals depending upon the particular circumstances for which assistance is required. These can include pre-programmed codes for summoning medical assistance, security assistance, vehicle assistance, directions, etc. The key fob 506 can be combined with a transmitting key fob of the type used for unlocking the doors of a vehicle, flashing its lights, etc. It is to be understood that while certain forms of the present invention have been illustrated and described herein, it is not to be limited to the specific forms or arrangement of parts described and shown.

What is claimed is:

1. An interactive system for a parking facility including multiple parking spaces for cars, which system includes:
   a) a control subsystem including a system processor with an input and an output;
   b) a plurality of smart light fixtures mounted in said facility and each connected to said system processor and each including a receiver;
   c) a user interface including an input device for receiving input to the user interface and an output device for providing output from the user interface, said input and output devices being connected to said control subsystem;
   d) a smart card with memory associated therewith, such said smart card being connected to said input and output devices for respectively inputting data to said system processor via said user interface and for receiving data output by said system processor via said user interface;

e) said smart card being associated with a user's account whereby parking events result in debits to said user's account, said smart card including means for including said parking events;

f) said system processor including external communications;

g) said external communications being adapted for transmitting inforniation to personnel for assisting a user of said facility;

h) a key fob including a transmitter for transmitting an assistance request to said system processor by way of said smart light fixture;

i) said system processor including a GPS component with GPS coordinates for said smart light fixtures and for said parking spaces; and j) said user interface providing GPS coordinates for respective open parking spaces within said facility.

* * * * *